United States Patent

Hattori et al.

[11] Patent Number: 5,952,052
[45] Date of Patent: Sep. 14, 1999

[54] PROCESS FOR FITTING GLASS MEMBERS ONTO VEHICLES

[75] Inventors: Jun Hattori, Takasago; Toshifumi Hirose, Kobe; Katsuhiro Ando, Akashi, all of Japan

[73] Assignee: Kaneka Corporation, Osaka, Japan

[21] Appl. No.: 09/051,499

[22] PCT Filed: Oct. 11, 1996

[86] PCT No.: PCT/JP96/02951

§ 371 Date: Aug. 28, 1998

§ 102(e) Date: Aug. 28, 1998

[87] PCT Pub. No.: WO97/13820

PCT Pub. Date: Apr. 17, 1997

[30] Foreign Application Priority Data

Oct. 12, 1995 [JP] Japan .................................. 7-291899

[51] Int. Cl.$^6$ ................................ B05D 1/00; B05D 3/00
[52] U.S. Cl. ........................................ 427/387; 427/389.7
[58] Field of Search ................................. 427/387, 389.7

[56] References Cited

U.S. PATENT DOCUMENTS 4,345,053  8/1982  Rizk et al. .............................. 525/440
4,652,610  3/1987  Dowbenko et al. .................... 525/100

FOREIGN PATENT DOCUMENTS 0 162 530 A2  11/1985  European Pat. Off. .
0 531 969 A1   3/1993  European Pat. Off. .
0 620 241 A1  10/1994  European Pat. Off. .
58-002342      1/1983  Japan .
62-238110     10/1987  Japan .
1-198661       8/1989  Japan .
4-093359       3/1992  Japan .
2 072 208      9/1981  United Kingdom .

Primary Examiner—Erma Cameron
Attorney, Agent, or Firm—Pollock, Vande Sande & Amernick

[57] ABSTRACT

The present invention has its object to a method for glazing a motor vehicle by direct glazing using a novel curable resin composition. A method for glazing a motor vehicle by direct glazing, which comprises using, as a sealant, a curable resin composition comprising (A) an oxyalkylene polymer having at least one silicon group containing a hydroxyl or hydrolyzable group bound to a silicon atom and capable of crosslinking by silanol condensation reaction, (B) carbon black, and (C) an oxyalkylene polymer not containing a crosslinking group is provided.

9 Claims, No Drawings

PROCESS FOR FITTING GLASS MEMBERS ONTO VEHICLES

TECHNICAL FIELD

The present invention relates to a method for glazing motor vehicles by direct glazing using a novel sealant composition.

BACKGROUND ART

The front and rear windows of cars or the windows of other motor vehicles that are not opened and closed are frequently glazed by the method known as direct glazing. Direct glazing is a technique by which glass sheets are directly mounted in position on the body of a vehicle with the aid of a sealant having high adhesive strength. The sealant for use in the direct glazing of cars is required to have the following characteristics.

1. The sealant should have sufficiently high mechanical strength to resist breakage; specifically it should have a tension at break of not less than 3 MPa.

2. The sealant should provide high glass-sealant adhesive strength and high vehicle-body-sealant adhesive strength.

3. The sealant should have a fair degree of rigidity and yet sufficient rubber elasticity to prevent propagation of vibrations and shocks to the glass. Specifically, it should be a rubber elastomer having a modulus at 100% elongation of not less than 1 MPa and an elongation at break of not less than 200%.

4. For expediting the glazing work, the sealant should have the property to cure quickly after installation of the glass member on the vehicle body; specifically a complete cure should be obtained within 10–40 minutes, preferably 10–20 minutes, in air at room temperature.

The sealant used in direct glazing today is a moisture-setting urethane sealant.

The present invention has its object to provide a method for direct glazing with use of a novel sealant in lieu of said urethane sealant. More specifically, the object of the invention is to provide a method for direct glazing with use of a novel curable composition insuring sufficient mechanical strength, adhesive strength, rubber elasticity, and workability.

The inventors of the present invention found that a sealant comprising an oxyalkylene polymer having a reactive silicon (Si) group containing a hydroxyl or hydrolyzable group bound to a silicon atom and capable of crosslinking by silanol condensation reaction has the above-mentioned properties and is suitable as a sealant for direct glazing and that it can be provided as a one-part system that is easy to work with. It was also found that although an oxyalkylene polymer having such a reactive Si group gives a cured product with somewhat insufficient tension at break, addition of carbon black as a filler results in a marked improvement in tension at break. In addition, it was found that while the cured product of an oxyalkylene polymer containing said reactive Si group exhibits rubber elasticity, a plasticizer is preferably added for further enhancement of rubber elasticity. Although the reason is unknown, when a plasticizer of low molecular weight, such as 2-ethylhexyl phthalate (DOP), is added and the resulting sealant is stored for many months, the setting rate is decreased to adversely affect workability. However, it was discovered that when an oxyalkylene polymer that is a plasticizer of high molecular weight is used and the resulting sealant is stored, no decrease in setting rate is encountered.

DISCLOSURE OF THE INVENTION

The present invention, therefore, is directed to a method for direct glazing motor vehicles by direct glazing, which comprises using, as a sealant, a curable resin composition comprising (A) an oxyalkylene polymer having at least one reactive Si group per molecule, (B) carbon black, and (C) an oxyalkylene polymer not containing a crosslinking group.

As component (A) in the present invention, an oxyalkylene polymer containing at least one reactive Si group per molecule is used. The main chain of this oxyalkylene polymer comprises a repeating unit of general formula (1)

$$—R—O— \tag{1}$$

wherein R represents a bivalent alkylene group.

R in the above formula is preferably a linear or branched alkylene group containing preferably 1–14 carbon atoms, more preferably 2–4 carbon atoms.

The repeating unit of the above formula includes but is not limited to such species as $—CH_2O—$, $—CH_2CH_2O—$, $—CH_2CH(CH_3)O—$, $—CH_2CH(C_2H_5)O—$, $—CH_2C(CH_3)_2O—$, and $—CH_2CH_2CH_2CH_2O—$.

The main chain of the oxyalkylene polymer may consist of only one kind of repeating unit or two or more kinds. Particularly, a polymer comprising propylene oxide as a main component is preferred. The main chain of the polymer may contain a repeating unit other than alkylene group. In such cases, the total sum of oxyalkylene units in the polymer is preferably not less than 50 weight %, more preferably not less than 80 weight %, and particularly not less than 90 weight %.

The reactive Si group may for example be a group of the formula $—Si(OCH_3)_3$ which, on hydrolysis by atmospheric moisture to a silanol group, e.g. $—Si(OH)_3$, undergoes silanol condensation reaction to form a siloxane bond (Si—O—Si).

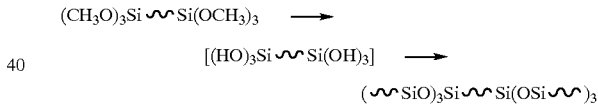

Therefore, a polymer containing such a reactive Si group crosslinks and hardens in the presence of moisture even at room temperature. The reactive Si group is a well-known reactive group. Typical of the reactive Si group are groups of the following general formula (2)

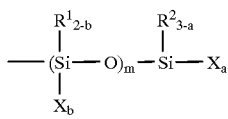

$$\tag{2}$$

wherein $R^1$ and $R^2$ each represents an alkyl group having 1–20 carbon atoms, an aryl group having 6–20 carbon atoms, an aralkyl group having 7–20 carbon atoms or a triorganosiloxy group of the formula $R^3_3SiO$ ($R^3$ represents a univalent hydrocarbon group having 1~20 carbon atoms and the 3 $R^3$s may be the same or different); where the number of occurrences of $R^1$ or $R^2$ is 2 or more, they may be the same or different; X represents a hydroxyl group or a hydrolyzable group and where the number of occurrences of X is 2 or more, they may be the same or different; a represents an integer of 0–3, b represents an integer of 0–2, and a and b satisfies a+Σb≧1; where m is 2 or more, the species of b may not be the same; m is an integer of 0–19.

The hydrolyzable group in general formula (2) is not particularly restricted but may be a known hydrolyzable group such as hydrogen, halogen, alkoxy, acyloxy, ketoximate, amino, amide, aminoxy, mercapto, and alkenyloxy, to mention just a few examples. In view of hydrolyzability under mild conditions and ease of handling, alkoxy groups such as methoxy and ethoxy are particularly preferred. The reactive Si group whose hydrolyzable moiety is alkoxy is referred to as an alkoxysilyl group.

The above hydrolyzable group and hydroxyl group may be bound, in the number of 1–3, to one Si atom, and (a+Σb) is preferably within the range of 1–5. Where two or more hydrolyzable groups or hydroxyl groups are contained in the reactive Si group, they may be the same or different. The number of silicon atoms in the reactive Si group may be only 1 or more than 1 but when silicon atoms are linked by siloxane bonding, the number of Si atoms is preferably not over 20. Particularly, reactive Si groups of the following general formula (3) are preferred because compounds containing such reactive Si groups are readily available.

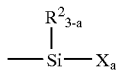

(3)

wherein $R^2$, X, and a are as defined above.

Referring to the above general formulas (2) and (3), $R^1$ and $R^2$ each includes alkyl groups such as methyl, ethyl, etc., cycloalkyl groups such as cyclohexyl etc.; aryl groups such as phenyl etc., aralkyl groups such as benzyl etc., and triorganosiloxy groups of the formula $R^3_3SiO-$ where $R^3$ may for example be methyl or phenyl. Particularly preferred is methyl for both $R^1$ and $R^2$.

The reactive Si group should be present in the number of at least one and preferably 1.1–5 per molecule of the oxyalkylene polymer. If the number of reactive Si groups per molecule is less than 1, only insufficient curability will be obtained, while too great a number of reactive Si groups results in an excessively dense network structure, thus detracting from elasticity and other mechanical characteristics.

The reactive Si group may be present at the terminal end of an oxyalkylene polymer chain or in an intermediate position of the polymer chain, or both at the terminal and intermediate positions. The reactive Si group is preferably present at the chain end, for a rubber-like cured product can then be easily obtained with high strength and high elongation. Moreover, such reactive Si group-containing oxyalkylene polymers can be used each alone or in combination.

The polymer for component (A) may be either a linear polymer or a branched polymer and its number average molecular weight may be about 500–50,000 and preferably about 1,000–30,000.

Introduction of a reactive Si group into a polymer can be effected by the known technology. For example, the following methods can be mentioned.

(a) An oxyalkylene polymer having a functional group such as hydroxy within the molecule is reacted with an organic compound having an active group reactive with said functional group as well as an unsaturated group to provide an unsaturation-containing oxyalkylene polymer. Alternatively, an unsaturation-containing epoxy compound is copolymerizing to prepare such an unsaturation-containing oxyalkylene polymer. This reaction product is reacted with a compound containing both a group reactive with said unsaturated group and a reactive Si group. The compound containing both a group reactive with said unsaturated group and a reactive Si group includes hydroxysilanes each containing a reactive Si group and mercapto compounds each containing a reactive Si group.

(b) An oxyalkylene polymer containing a functional group such as hydroxyl, acryloyl, amino, mercapto, epoxy, or isocyanato is reacted with a compound having both a group reactive with said functional group and a reactive Si group.

Preferred, among the above methods, is method (a) or method (b) wherein a hydroxy-terminated polymer is reacted with a compound containing an isocyanate group and a reactive Si group.

The oxyalkylene polymer for component (A) includes but is not limited to the polymers proposed in Japanese Kokoku Publication Sho-45-36319 and Sho-46-12154; Japanese Kokai Publication Sho-50-156599, Sho-54-6096, Sho-55-13767, Sho-55-13468, and Sho-57-164123; Japanese Kokoku Publication Hei-3-2450; U.S. Pat. No. 3,632,557, U.S. Pat. No. 4,345,053, U.S. Pat. No. 4,366,307, and U.S. Pat. No. 4,960,844 and oxyalkylene polymers of high molecular weight and narrow molecular weight distribution, i.e. oxyalkylene polymers with a number average molecular weight of not less than 6,000 and an Mw/Mn ratio of not more than 1.6, as proposed in Japanese Kokai Publication Sho-61-197631, Sho-61-215622, Sho-61-215623, and Sho-61-218632, among others.

Those reactive Si group-containing oxyalkylene polymers can be used each alone or in combination.

AS component (A), a modification product of such a reactive Si group-containing oxyalkylene polymer can also be used. As representative examples of such modification product, there can be mentioned the modified polymers obtainable by polymerizing a vinyl or other monomer in the presence of a reactive Si group-containing oxyalkylene polymer. A preferred specific example of such modified polymer is a polymer prepared by mix-polymerizing an alkyl acrylate monomer and/or alkyl methacrylate monomer containing an alkyl group having 1–8 carbon atoms of the following general formula (4) and an alkyl acrylate monomer and/or alkyl methacrylate monomer containing an alkyl group having 10 or more carbon atoms of the following general formula (5) in the presence of a reactive Si group-containing oxyalkylene polymer. When such a modified polymer is used, the weather resistance of the cured product of the curable resin composition is improved.

$$CH_2=C(R^5)(COOR^4) \qquad (4)$$

wherein $R^4$ represents an alkyl group having 1–8 carbon atoms and $R^5$ represents hydrogen or methyl.

$$CH_2=C(R^5)(COOR^6) \qquad (5)$$

wherein $R^5$ is as defined above and $R^6$ represents an alkyl group having 10 or more carbon atoms.

$R^4$ in the above general formula (4) is an alkyl group having 1–8 carbon atoms, such as methyl, ethyl, propyl, n-butyl, t-butyl, 2-ethylhexyl, etc., preferably alkyl having 1–4 carbon atoms, and more preferably alkyl having 1–2 carbon atoms. Monomers of general formula (4) can be used each alone or in combination.

$R^6$ in the above general formula (5) is a long-chain alkyl group containing 10 or more carbon atoms, generally 10~30 carbon atoms, and preferably 10~20 carbon atoms, thus including lauryl, tridecyl, cetyl, stearyl, docosyl, behenyl, and so forth. Monomers of general formula (5) can be used each alone or in combination.

The ratio by weight of the monomer of formula (4) to the monomer of formula (5) is preferably 95:5~40:60 and more preferably 90:10~60:40.

In this polymerization reaction system, monomers other than said monomers (4) and (5) may also be present. Among such other monomers are acrylic acids such as acrylic acid and methacrylic acid; monomers containing amide groups, such as acrylamide, methacrylamide, N-methylolacrylamide, N-methylolmethacrylamide, etc., epoxy-containing monomers such as glycidyl acrylate, glycidyl methacrylate, etc., and amino-containing monomers such as diethylaminoethyl acrylate, diethylaminoethyl methacrylate, aminoethyl vinyl ether, etc.; and other monomers such as acrylonitrile, styrene, α-methylstyrene, alkyl vinyl ethers, vinyl chloride, vinyl acetate, vinyl propionate, and ethylene. In such cases, the combined proportion of monomers (4) and (5) in the polymer is preferably not less than 50 weight %, particularly not less than 70 weight % of the total monomer polymerized.

The polymer obtainable by polymerizing a vinyl or other monomer having a reactive Si group in the presence of an oxyalkylene polymer not containing a reactive Si group can also be used as component (A) according to the present invention.

Such modified polymers are described in Japanese Kokai Publication Sho-59-78223, Sho-59-168014, Sho-60-228516, and Sho-60-228517, for instance, but these are not exclusive choices.

Carbon black, which is component (B) according to the invention, functions as a filler. Generally, carbon black is known as a reinforcing filler for rubbers. The known kinds of carbon black can be used in the present invention.

Component (B) is added for improving the dynamic characteristics of the cured product and enhancing the elastic modulus and tension at break so as to make the composition applicable as an automotive glass sealant.

Component (B) specifically includes but is not limited to channel black, furnace black, thermal black, lamp black, and acetylene black. Those species of carbon black for component (B) can be used each alone or in combination.

The proportion of component (B) relative to 100 parts (by weight; the same applies hereinafter) of the oxyalkylene polymer is 0.1~500 parts and preferably 10~200 parts. If its proportion is less than 0.1 part, the intended effect may not be realized. On the other hand, using carbon black in excess of 500 parts is undesirable, for workability and dynamic properties of the cured product may then be adversely affected.

The oxyalkylene polymer not containing a crosslinking group within the molecule, for use as component (C) in accordance with the invention, is a polymer containing a repeating unit of general formula (1) and not containing a crosslinking group such as said reactive Si group. Component (C) acts as a plasticizer. Use of this plasticizer has the advantage that even when the sealant composition is stored, the setting rate is not reduced on storage. Thus, although the reason is unknown, the use of a low molecular weight plasticizer such as 2-ethylhexyl phthalate (DOP) decreases the setting rate on long-term storage. Therefore, aggravation of surface curability and of the strength of the initial cured product occurs and the cure time is prolonged to sacrifice workability. However, when the oxyalkylene polymer, which is a high molecular plasticizer, is added and the resulting sealant composition is caused to cure after storage, there is no aggravation of surface curability or decrease in strength of the initial cured product. Furthermore, the composition used in the present invention is excellent in depth curability as well, thanks to incorporation of component (C). Since compound (C) acts as a plasticizer, it is of course necessary that it contain no crosslinking group but it is also preferable that component (C) contain no functional group reactive with the reactive Si group of component (A). The functional group mentioned just above includes active hydrogen-containing groups such as hydroxy, amino, carboxy, etc. and other groups reactive with said reactive Si group, such as ester, amide, urethane, urea and other groups. The most desirable polymer for component (C) is an oxyalkylene polymer with its terminal hydroxyl group blocked in the form of alkoxy or alkenyloxy.

Component (C) may be either a linear polymer or a branched polymer and its molecular weight is preferably 100–50,000 and more preferably 300–30,000. Two or more different polymers can be used in combination. Since component (C) acts as a plasticizer as mentioned above, its molecular weight is preferably smaller than that of component (A) by not less than 1,000, preferably not less than 3,000. Moreover, the polymer as component (C) may contain a repeating unit other than the repeating unit of general formula (1). The proportion of component (C) relative to 100 parts of the oxyalkylene polymer for component (A) is preferably 0.01~600 parts and more preferably 10~100 parts. If the proportion of component (C) is smaller than 0.01 part, the plasticizing effect can hardly be expressed, while use of component (C) in excess of 600 parts may adversely affect the dynamic characteristics of the cured product.

Where necessary, the curable resin composition for use in the present invention may be supplemented with various additives selected from the group consisting of silanol condensation catalysts, fillers other than component (B), plasticizers other than component (C), dehydrating agents, cosolubilizers, adhesion improving agents, physical characteristic modifiers, storage stability improving agents, aging inhibitors, ultraviolet absorbers, sequestrants, ozone degradation inhibitors, light stabilizers, amine series radical chain terminators, phosphorus series peroxide decomposers, lubricants, pigments, blowing agents, flame retardants, antistatic agents, and silane compounds, each in a suitable amount.

The silanol condensation catalyst is a reagent which promotes the reaction of said reactive Si group. The silanol condensation catalyst includes but is not limited to titanic acid esters such as tetrabutyl titanate, tetrapropyl titanate, etc.; organotin compounds such as dibutyltin dilaurate, dibutyltin maleate, dibutyltin diacetate, tin octylate, tin naphthenate, dibutyltin oxide-phthalic ester reaction product, dibutyltin diacetylacetonate, etc.; organoaluminum compounds such as aluminum tris(acetylacetonate), aluminum tris(ethylacetoacetate), diisopropoxyaluminum ethylacetoacetate, etc.; reaction products of bismuth salts with organic carboxylic acids, such as bismuth-tris(2-ethylhexoate), bismuth-tris(neodecanoate), etc.; chelate compounds such as zirconium tetrakis(acetylacetonate), titanium tetrakis(acetylacetonate), etc.; organolead compounds such as lead octanoate etc.; organovanadium compounds; amine compounds such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris (dimethylaminomethyl)phenol, morpholine, N-methylmorpholine, 2-ethyl-4-methylimidazole, 1,1-diazabicyclo(5.4.0)undecene-7 (DBU), etc. or their salts with carboxylic acids; low molecular weight polyamide resins available on reaction of an excess of a polyamine with polybasic acids; and reaction products of an excess of a polyamine with epoxy compounds. The above is not an exclusive list but any condensation catalyst in routine use can be employed. Those silanol condensation catalysts can be used each alone or in combination. From the standpoint of curability, an organometal compound or a combination of an organometal compound with an amine is preferred. Particularly, organotin compounds such as dibutyltin dilaurate, dibutyltin maleate, dibutyltin diacetate, tin octylate, tin naphthenate, dibutyltin oxide-phthalic ester reaction product, and dibutyltin bis(acetylacetonate) are preferred.

The proportion of the silanol condensation catalyst is preferably about 0.01~20 parts, more preferably about 0.1~10 parts, based on 100 parts of the reactive Si group-containing oxyalkylene polymer. If the proportion of the silanol condensation catalyst is too small, the setting rate is decreased and the curing reaction may not proceed sufficiently. On the other hand, if the ratio of the silanol condensation catalyst to the oxyalkylene polymer is too high, local generation of heat and foaming occurs in the course of curing so that no satisfactory cured product can be obtained.

In the curable resin composition of the present invention, fillers other than carbon black can also be included. As such other fillers, there can be mentioned sawdust, walnut shell meal, chaff meal, pulp, cotton chip, mica, graphite, diatomaceous earth, terra alba, kaolin, clay, talc, fumed silica, precipitated silica, silicic anhydride, quartz powder, glass beads, calcium carbonate, magnesium carbonate, titanium dioxide, aluminum dust, zinc dust, asbestos, glass fiber, and carbon fiber, among other fillers. Those fillers other than carbon black can be used each alone or in combination. The amount of such fillers other than carbon black relative to 100 parts of the reactive Si group-containing oxyalkylene polymer is preferably about 1~200 parts and more preferably about 10~150 parts. Inasmuch as the object of the invention is accomplished, the curable resin composition for use in the present invention may contain other plasticizers other than said oxyalkylene polymer not containing a crosslinking group for component (C). As such plasticizers, there can be mentioned phthalic esters such as dioctyl phthalate, diisodecyl phthalate, dibutyl phthalate, butyl benzyl phthalate, etc.; epoxy series plasticizers such as epoxidized soybean oil, epoxidized linseed oil, benzyl epoxystearate, etc.; polyester series plasticizers such as polyesters obtained from dibasic acids and dihydric alcohols; polystyrene compounds such as poly-α-methylstyrene, polystyrene, etc.; and such other plasticizers as polybutadiene, butadiene-acrylonitrile copolymer, polychloroprene, polyisoprene, polybutene, chlorinated paraffins, and so on. Those plasticizers can also be used each alone or in combination.

The curable resin composition for use in the present invention may contain, in addition to said oxyalkylene polymer containing at least one reactive Si group for (A), one or more other polymers containing reactive Si groups, such as polydimethylsiloxane. Furthermore, polymers not containing a reactive Si group other than the polymers mentioned for component (C) can also be added. Preferred among such polymers are vinyl polymers containing reactive Si groups, particularly the reactive Si group-containing copolymer obtainable by polymerizing said (meth)acrylic ester monomer of general formula (4) with said alkyl (meth)acrylate monomer of general formula (5). When this copolymer is used, the weather resistance of the cured product of the curable resin composition is improved. The ratio of the polymer unit derived from the monomer of formula (4) to the polymer unit derived from the monomer of formula (5) is preferably 95:5~40:60, by weight, and more preferably 90:10~60:40, by weight.

This copolymer may contain other monomer units other than the monomer of formula (4) and the monomer of formula (5). As a typical example of such comonomer, acrylic acid may be mentioned. In such cases, the combined amount of units (4) and (5) in the copolymer is preferably not less than 50 weight %, particularly not less than 70 weight %. This copolymer preferably has a number average molecular weight of 500~100,000 from the standpoint of the ease of handling. The reactive Si group of this copolymer may be the same as the reactive Si group of the oxyalkylene polymer mentioned for component (A). For insuring a sufficient degree of curability, the average number of reactive Si groups in this copolymer should be not less than 1, preferably not less than 1.1, and for better results, not less than 1.5. It is also preferable that the apparent number average molecular weight per said reactive Si group be 300~4,000.

Vinyl polymers containing reactive Si groups are proposed in Japanese Kokai Publication Sho-59-122541, Sho-63-112642, and Hei-6-172631, among other literature.

The method for production of the curable resin composition comprising said components (A), (B), and (C) for use in the present invention is not particularly restricted but includes the conventional methods, for example the method which comprises formulating said components (A), (B), and (C) and kneading the formulation by means of a mixer, roll or kneader and the method which comprises dissolving each of the components in a solvent and blending the solutions. Moreover, this composition can be provided in either a one-part system or a two-part system. Installation of glass members on a motor vehicle body can also be effected by the known techniques.

BEST MODES FOR CARRYING OUT THE INVENTION

EXAMPLE

Examples 1–3 and Comparative Examples 1 and 2

One-hundred (100) parts of an oxypropylene polymer with an average molecular weight of 10,000 and having an average of 1.5 units of the methyldimethoxysilyl group —$Si(OCH_3)_2CH_3$ at its terminus (hereinafter referred to as "methyldimethoxysilyl-terminated oxypropylene polymer") was mixed with the components indicated in Table 1 to provide a curable resin composition. Thus, using a planetary mixer, calcium carbonate and carbon black, dried by heating, were kneaded with the methyldimethoxysilyl-terminated oxypropylene polymer and other components.

Referring to the plasticizer in Table 1, oxyalkylene polymer (1) is an allyloxy ($CH_2=CHCH_2O$—)-terminated oxypropylene polymer with an average molecular weight of 5,000.

The properties of the curable resin composition and of the cured product were determined as follows.

(1) Surface curability

The curable resin composition was filled into an open-top vessel and allowed to cure at 23° C. and 60% RH and the time to disappearance of stringiness on the surface of the composition (skinning time) was measured.

(2) Dynamic characteristics

The curable resin composition was spread in a thickness of 3 mm on a polyethylene film and allowed to stand at 23° C. and 60% RH for a predetermined time. In accordance with JIS K 6301, a NO. 3 dumbbell was prepared and the tensile characteristics [modulus at 100% elongation (M100), tension at break (TB), and elongation at break (EB)] were measured at a pulling speed of 200 mm/min.

(3) Depth curability

The curable resin composition was filled into an open-top vessel and allowed to stand at 23° C. and 60% RH for a predetermined time. The cured layer was then taken out and the center thickness of the layer was measured as cured thickness. The larger this thickness is, the superior depth curability is.

(4) Shelf life

A sealed container filled with the curable resin composition was allowed to sit at 50° C. for 28 days and the above determinations (1)~(3) were carried out. The shelf life was rated good when no changes were found in the determinations.

The results of determinations are shown in Table 2. It is apparent from Table 2 that the cured product of the curable resin composition for use in the present invention has sufficient tension at break and elongation at break (rubber elasticity) necessary for a sealant used in direct glazing for motor vehicle. Furthermore, the curable resin composition for use in the present invention shows a sufficiently high setting rate suited for use as a sealant for direct glazing. In addition, even after storage, the composition shows no prolongation of skinning time, no decrease in tension at break in the early phase of curing, and no change in depth curability, indicating that the curable resin composition for use in the invention has a satisfactory shelf life.

INDUSTRIAL APPLICABILITY

The method for glazing a motor vehicle by direct glazing according to the invention employs a novel curable resin composition which provides seals with sufficient tension at break and elongation at break. Moreover, the curable resin composition for use in the invention exhibits a sufficiently high setting rate and has a satisfactory shelf life.

We claim:

1. A method for glazing a motor vehicle by direct glazing, which comprises using, as a sealant, a curable resin composition comprising (A) an oxyalkylene polymer having at least one silicon group containing a hydroxyl or hydrolyzable group bound to a silicon atom and which crosslinks by silanol condensation reaction, (B) carbon black, and (C) an oxyalkylene polymer not containing a crosslinking group.

TABLE 1

| Composition (parts by weight) | | Example | | | | Comparative Example | |
| --- | --- | --- | --- | --- | --- | --- | --- |
| | | 1 | 2 | 3 | 4 | 1 | 2 |
| Methyldimethoxysilyl-terminated oxypropylene polymer | | 100 | 100 | 100 | 100 | 100 | 100 |
| Plasticizer | Oxyalkylene polymer (1) | 50 | 50 | 50 | 50 | — | — |
| | Diisodecyl phthalate | — | — | — | — | 50 | 50 |
| Furnace black | Asahi Carbon Co., Asahi #70 | 30 | 50 | — | — | 30 | 50 |
| | Asahi Carbon Co., Asahi #60 | — | — | 70 | — | — | — |
| | Asahi Carbon Co., Asahi #55 | — | — | — | 70 | — | — |
| Calcium carbonate gel | Shiraishi Kogyo, Hakuenka CCR | 120 | 50 | 50 | 50 | 120 | 50 |
| Silanol condensation catalyst | Nitto Kasei, Neostan U-220 | 2 | 2 | 2 | 2 | 2 | 2 |
| UV absorber | Ciba-Geigy (Japan), Tinuvin 327 | 1 | 1 | 1 | 1 | 1 | 1 |
| Light stabilizer | Sankyo, Sanol LS-770 | 1 | 1 | 1 | 1 | 1 | 1 |

TABLE 2

| | | Example | | | | Comparative Example | |
| --- | --- | --- | --- | --- | --- | --- | --- |
| | | 1 | 2 | 3 | 4 | 1 | 2 |
| Normal state | Skinning time (min) Postcure day 1 | 14 | 14 | 14 | 15 | 19 | 16 |
| | M100 (MPa) | 1.1 | 1.1 | 1.9 | 1.6 | 1.2 | 1.2 |
| | TB (MPa) | 3.2 | 3.9 | 3.7 | 3.3 | 3.6 | 4.0 |
| | EB (%) | 510 | 390 | 250 | 280 | 400 | 410 |
| | Postcure day 7 | | | | | | |
| | M100 (MPa) | 1.1 | 1.2 | 2.0 | 1.8 | 1.3 | 1.3 |
| | TB (MPa) | 3.3 | 4.7 | 4.0 | 3.3 | 3.7 | 4.6 |
| | EB (%) | 470 | 430 | 240 | 250 | 370 | 410 |
| | Cure depth | | | | | | |
| | Postcure day 1 (mm) | 4.4 | 4.4 | 4.4 | 4.2 | 3.4 | 3.4 |
| | Postcure day 7 (mm) | 12.1 | 11.8 | 12.1 | 11.5 | 9.4 | 8.9 |
| After storage (50° C., 28 day) | Skinning time (min) Postcure day 1 | 12 | 13 | 13 | 12 | 30 | 40 |
| | M100 (MPa) | 0.9 | 0.9 | 1.5 | 1.3 | 0.6 | 0.5 |
| | TB (MPa) | 2.7 | 3.3 | 3.5 | 2.9 | 1.6 | 1.6 |
| | EB (%) | 530 | 430 | 290 | 330 | 590 | 450 |
| | Postcure day 7 | | | | | | |
| | M100 (MPa) | 1.2 | 1.3 | 2.2 | 1.9 | 1.0 | 1.1 |
| | TB (MPa) | 3.3 | 4.2 | 4.3 | 3.7 | 2.7 | 3.9 |
| | EB (%) | 460 | 350 | 230 | 250 | 460 | 420 |
| | Cure depth | | | | | | |
| | Postcure day 1 (mm) | 5.1 | 4.8 | 4.9 | 4.8 | 4.5 | 4.3 |
| | Postcure day 7 (mm) | 13.2 | 12.7 | 12.9 | 12.4 | 11.1 | 11.1 |

2. The method for glazing a motor vehicle according to claim 1 wherein the silicon group containing a hydroxyl or hydrolyzable group bound to a silicon atom and which crosslinks by silanol condensation reaction is a group of the general formula:

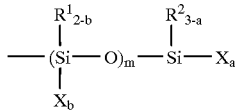

wherein $R^1$ and $R^2$ each represents an alkyl group having 1 to 20 carbon atoms, an aryl group having 6 to 20 carbon atoms, an aralkyl group having 7 to 20 carbon atoms or a triorganosiloxy group of the formula $R^3{}_3SiO-$ ($R^3$ represents a univalent hydrocarbon group having 1 to 20 carbon atoms and the 3 $R^3$s may be the same or different); where the number of occurrences of $R^1$ or $R^2$ is 2 or more, they may be the same or different; X represents a hydroxyl group or a hydrolyzable group and where the number of occurrences of X is 2 or more, they may be the same or different; a represents an integer of 0 to 3, b represents an integer of 0 to 2, and a and b satisfies $a+\Sigma b \geq 1$; where m is 2 or more, the species of b may not be the same; m is an integer of 0 to 19.

3. The method for glazing a motor vehicle according to claim 1 wherein the silicon group containing a hydroxyl or hydrolyzable group bound to a silicon atom and which crosslinks by silanol condensation reaction is a group of the general formula:

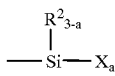

wherein $R^2$, X, and a are as defined above.

4. The method for glazing a motor vehicle according to claim 1 wherein the oxyalkylene polymer for (A) is an oxypropylene polymer.

5. The method for glazing a motor vehicle according to claim 1 wherein the oxyalkylene polymer for (C) is an oxypropylene polymer.

6. The method for glazing a motor vehicle according to claim 1 wherein the oxyalkylene polymer for (C) is a polymer not containing a functional group reactive with the at least one silicon group.

7. The method for glazing a motor vehicle according to claim 1 wherein the curable resin composition is a one-part curable resin composition.

8. The method for glazing a motor vehicle according to claim 1 wherein said curable resin composition gives a cured product having a tensile characteristic with a modulus at 100% elongation of not less than 1 MPa, a tension at break of not less than 3 MPa, and an elongation at break of not less than 200%.

9. The method for producing a sealant for use in direct glazing of a motor vehicle, which comprises using, as a sealant, a curable resin composition comprising (A) an oxyalkylene polymer having at least one silicon group containing a hydroxyl or hydrolyzable group bound to a silicon atom and which crosslinks by silanol condensation reaction, (B) carbon black, and (C) an oxyalkylene polymer not containing a crosslinking group.

* * * * *